US009228900B2

(12) United States Patent
Preston et al.

(10) Patent No.: US 9,228,900 B2
(45) Date of Patent: Jan. 5, 2016

(54) MULTI-FUNCTION SPECTROMETER-ON-CHIP WITH A SINGLE DETECTOR ARRAY

(71) Applicant: Tornado Spectral Systems Inc., Toronto (CA)

(72) Inventors: Kyle Preston, Groton, NY (US); Arthur Nitkowski, Ithaca, NY (US); Nicholas Sherwood, Ithaca, NY (US); Arsen Hajian, Brookline, MA (US)

(73) Assignee: Tornado Spectral Systems Inc., Toronto (CA)

( * ) Notice: Subject to any disclaimer, the term of this patent is extended or adjusted under 35 U.S.C. 154(b) by 0 days.

(21) Appl. No.: 14/582,453

(22) Filed: Dec. 24, 2014

(65) Prior Publication Data

US 2015/0153228 A1    Jun. 4, 2015

Related U.S. Application Data

(63) Continuation of application No. 14/035,348, filed on Sep. 24, 2013, now Pat. No. 8,937,717.

(60) Provisional application No. 61/704,911, filed on Sep. 24, 2012.

(51) Int. Cl.
*G01J 3/447* (2006.01)
*G01J 3/02* (2006.01)
(Continued)

(52) U.S. Cl.
CPC .............. *G01J 3/447* (2013.01); *G01J 3/0205* (2013.01); *G01J 3/0218* (2013.01); *G01J 3/0224* (2013.01);
(Continued)

(58) Field of Classification Search
CPC ................ G01J 3/02; G01J 3/10; G01J 3/18; G01J 3/2803; G01J 3/2823; G01J 3/28; G01J 3/447; G01J 3/42; G01N 21/211
USPC .................................................. 356/300–334
See application file for complete search history.

(56) References Cited

U.S. PATENT DOCUMENTS 5,905,571 A   5/1999  Butler et al.
6,590,656 B2  7/2003  Xu et al.
(Continued)

FOREIGN PATENT DOCUMENTS

CA    2233849 C    9/1999
CA    2482724      8/2005

OTHER PUBLICATIONS

Document relating to International Application No. PCT/CA2013/000816 dated Dec. 16, 2013 (International Search Report and Written Opinion).

(Continued)

*Primary Examiner* — Abdullahi Nur
(74) *Attorney, Agent, or Firm* — Bereskin & Parr LLP /S.E.N.C.R.L., s.r.l.; Tony Orsi

(57) ABSTRACT

Various embodiments of apparatuses, systems and methods are described herein for a spectrometer comprising at least two dispersive elements configured to receive at least one input optical signal and generate two or more pluralities of spatially separated spectral components, at least a portion of the at least two dispersive elements being implemented on a first substrate; and a single detector array coupled to the at least two dispersive elements and configured to receive and measure two or more pluralities of narrowband optical signals derived from the two or more pluralities of spatially separated spectral components, respectively.

25 Claims, 8 Drawing Sheets

(51) Int. Cl.
*G01J 3/18* (2006.01)
*G01J 3/28* (2006.01)
*G01J 3/36* (2006.01)

(52) U.S. Cl.
CPC .......... *G01J 3/0259* (2013.01); *G01J 3/18* (2013.01); *G01J 3/1804* (2013.01); *G01J 3/1895* (2013.01); *G01J 3/2803* (2013.01); *G01J 3/36* (2013.01)

(56) References Cited

U.S. PATENT DOCUMENTS

| | | | | |
|---|---|---|---|---|
| 6,862,092 | B1* | 3/2005 | Ibsen et al. | 356/328 |
| 7,194,177 | B2 | 3/2007 | Xu et al. | |
| 7,298,945 | B2 | 11/2007 | Gunn, III et al. | |
| 7,397,987 | B2 | 7/2008 | Witzens et al. | |
| 7,440,105 | B2 | 10/2008 | Adel et al. | |
| 2002/0105725 | A1 | 8/2002 | Sweatt et al. | |
| 2004/0151459 | A1 | 8/2004 | Cheben et al. | |
| 2005/0129363 | A1 | 6/2005 | McGreer | |
| 2005/0168738 | A1* | 8/2005 | Ohnishi et al. | 356/328 |
| 2005/0270647 | A1 | 12/2005 | Polack et al. | |
| 2006/0192971 | A1* | 8/2006 | Carver | 356/455 |
| 2007/0030484 | A1 | 2/2007 | Sobczynski | |
| 2007/0038040 | A1 | 2/2007 | Cense et al. | |
| 2010/0182609 | A1 | 7/2010 | Wang et al. | |
| 2010/0322555 | A1 | 12/2010 | Vermeulen et al. | |
| 2012/0236382 | A1 | 9/2012 | Puegner et al. | |
| 2014/0085634 | A1 | 3/2014 | Preston et al. | |

OTHER PUBLICATIONS

Bernhard Baumann et al., "Single camera based spectral domain polarization sensitive optical coherence tomography", Optics Express, vol. 15, No. 3, Feb. 5, 2007, pp. 1054-1063.

Barry Cense et al., "Polarization-sensitive spectral-doman optical coherence tomomography using a single line scan camera", Optics Express, vol. 15, No. 5, Mar. 5, 2007, pp. 2421-2431.

Chuanmao Fan at al., "Spectral domain polarization sensitive optical coherence tomography achieved by single camera detection", Optics Express, vol. 15, No. 13, Jun. 25, 2007, pp. 7950-7961.

Erich Gotzinger et al., "High speed spectral domain polarization sensitive optical coherence tomography of the human retina", Optics Express, vol. 13, No. 25, Dec. 12, 2005, pp. 10217-10229.

Sang-Won Lee at al., "High-speed spectral domain polarization-sensitive optical coherence tomography using a single camera and an optical switch at 1.3 μm", Journal of Biomedical Optics, vol. 15(1), Jan./Feb. 2010, pp. 010501-1-010501-3.

Tilman Schmoll et al., "Single-camera polarization-sensitive spectral-domain OCT by spatial frequency encoding", Optics Letters, vol. 35, No. 2, Jan. 15, 2010, pp. 241-243.

Cheol Song et al., "Polarization sensitive spectral-domain optical coherence tomography using a multi-line single camera spectrometer", Optics Express, vol. 18, No. 23, Nov. 8, 2010, pp. 23805-23817.

Mingtao Zhao et al., "Single-camera sequential-scan-based polarization-sensitive SDOCT for retinal imaging"Optics Letters, vol. 34, No. 2, Jan. 15, 2009, pp. 205-207.

K. A. McGreer, "Theory of concave gratings based on a recursive definition of facet positions", Applied Optics, vol. 35, No. 30, Oct. 20, 1996, pp. 5904-5910.

\* cited by examiner

US 9,228,900 B2

MULTI-FUNCTION SPECTROMETER-ON-CHIP WITH A SINGLE DETECTOR ARRAY

CROSS REFERENCE TO RELATED APPLICATION

This application is a continuation of U.S. patent application Ser. No. 14/035,348, filed on Sep. 24, 2013 and now issued to patent as U.S. Pat. No. 8,937,717 which claims the benefit of U.S. Provisional Application No. 61/704,911 filed on Sep. 24, 2012. The entire contents of application Ser. No. 14/035,348 and 61/704,911 are hereby incorporated by reference.

FIELD

The various embodiments described herein generally relate to an apparatus and method for implementing and using a spectrometer that performs multiple functions.

BACKGROUND

An optical spectrometer is a system that is used to sample the spectral components of an optical signal. In a general case, dispersive spectrometers use a dispersive element such as a diffraction grating to spatially distribute the spectral components of the optical signal. These spectral components are then measured by a linear array of detector elements, also known as a detector array.

Spectrometers that are built using discrete free-space optical components such as gratings and lenses are typically designed to measure only the wavelength content of one optical signal in one way, for example with a characteristic dispersion over a fixed operating bandwidth. In one example, these conventional spectrometers are typically not designed to measure both the spectrum and the polarization state of light in the optical signal. Polarization describes the orientation of the oscillation of the light wave's electric field. The polarization of light can be described using a combination of two orthogonal basis states. While there are some spectrometers that split the light signal into two polarization states and measure the spectral components for each polarization, these spectrometers use more optical components and/or require additional signal processing. As a result, the polarization needs to be controlled and managed at each interaction between a free-space beam and an optical surface, and this is generally a costly and difficult task using free-space optics.

SUMMARY OF VARIOUS EMBODIMENTS

In one broad aspect, at least one embodiment described herein provides a spectrometer comprising at least two dispersive elements configured to receive at least one input optical signal and generate two or more pluralities of spatially separated spectral components, at least a portion of the at least two dispersive elements being implemented on a first substrate; and a single detector array coupled to the at least two dispersive elements and configured to receive and measure two or more pluralities of narrowband optical signals derived from the two or more pluralities of spatially separated spectral components, respectively.

In at least some embodiments, the at least two dispersive elements comprise a first dispersive element disposed on the first substrate and configured to receive a first input optical signal and generate a first plurality of spatially separated spectral components; and a second dispersive element disposed on the first substrate and configured to receive a second input optical signal and generate a second plurality of spatially separated spectral components.

In at least some embodiments, the spectrometer comprises a polarization splitter configured to receive an initial input optical signal and spatially separate the initial input optical signal into the first input optical signal having the first polarization state and the second input optical signal having the second polarization state over the operating bandwidth range. The first dispersive element may be coupled to the polarization splitter to receive the first input optical signal and generate the first plurality of spatially separated spectral components having the first polarization state; and the second dispersive element may be coupled to the polarization splitter to receive the second input optical signal and generate the second plurality of spatially separated spectral components having the second polarization state.

In at least some embodiments, the polarization splitter may be implemented on one of the first substrate or a separate substrate.

In at least some embodiments, the at least two dispersive elements are configured to share a common footprint in a polarization-splitting grating configuration implemented on the first substrate, the polarization-splitting grating configuration having a difference in effective indices of refraction for first and second polarization states over an operating bandwidth range, wherein the polarization-splitting grating configuration is configured to receive an initial input optical signal as the at least one input optical signal and spatially separate the initial input optical signal into a first plurality of spatially separated signals having a first polarization state and a second plurality of spatially separated signals having a second polarization state.

In at least some embodiments, a difference in effective indices of refraction for the first and second polarization states is large enough to spatially separate the two polarization components of the initial input optical signal such that a minimum output angle of the first plurality of spatially separated spectral components having the first polarization state is larger than a maximum output angle of the second plurality of spatially separated spectral components having the second polarization state over the operating bandwidth range.

In at least some embodiments, the polarization-splitting grating configuration comprises a Planar Concave Grating (PCG) polarization-splitting grating having a difference in effective indices of refraction for the first and second polarization states such that the first plurality of spatially separated spectral components having the first polarization state is disposed along a first portion of an output of the PCG polarization-splitting grating and the second plurality of spatially separated spectral components having the second polarization state is disposed along a second portion of the output different than the first portion.

In at least some embodiments, the first plurality of spatially separated spectral components having the first polarization state may be disposed along a first portion of an output focal curve of the PCG polarization-splitting grating and the second plurality of spatially separated spectral components having the second polarization state may be disposed along a second portion of the output focal curve different than the first portion.

In at least some embodiments, the polarization-splitting grating configuration comprises an Arrayed Waveguide Grating (AWG) grating dispersive element having a difference in effective indices for the first and second polarization states such that the first plurality of spatially separated spectral components having the first polarization state is disposed along a first portion of an output of the AWG polarization-splitting grating and the second plurality of spatially separated spectral components having the second polarization state is disposed along a second portion of the output different than the first portion.

In at least some embodiments, the first plurality of spatially separated spectral components having the first polarization state may be disposed along a first portion of an output focal curve of the AWG polarization-splitting grating and the second plurality of spatially separated spectral components having the second polarization state may be disposed along a second portion of the output focal curve different than the first portion.

In at least some embodiments, the first and second plurality of spatially separated spectral components are transmitted using grating mode orders $m_1$ and $m_2$ and the first and second effective indices of refraction ($n_{eff,1}$ and $n_{eff,2}$ respectively) of the polarization-splitting grating configuration are designed to satisfy the condition $m_1 \lambda_{min}/n_{eff,1}(\lambda_{min}) > m_2 \lambda_{max}/n_{eff,2}(\lambda_{max})$, where numerals 1 and 2 represent the first and second polarization states respectively, $m_1$ and $m_2$ can be similar or different mode orders, $\lambda_{min}$ and $\lambda_{max}$ define minimum and maximum wavelengths over the operating bandwidth range and $n_{eff,1}(\lambda_{min})$ and $n_{eff,2}(\lambda_{max})$ represent effective indices of refraction at the minimum and maximum wavelengths of the operating bandwidth range.

In at least some embodiments, the polarization-splitting grating configuration is further configured to independently focus the first and second pluralities of spatially separated spectral components having different polarization states by positioning each facet in a set of facets to substantially simultaneously provide an optical path length difference of $m_2 \lambda_0/n_{eff,2}(\lambda_0)$ and $m_1 \lambda_0/n_{eff,1}(\lambda_0)$ compared to adjacent facets, where numerals 1 and 2 represent the first and second polarization states respectively, $m_1$ and $m_2$ are similar or different mode orders, $\lambda_0$ is a central wavelength for a given mode order and $n_{eff,1}(\lambda_0)$ and $n_{eff,2}(\lambda_0)$ represent the indices of refraction for the first and second mode orders respectively.

In at least some embodiments, the spectrometer further comprises two or more waveguide arrays to capture and transmit the two or more pluralities of narrowband optical signals from outputs of the at least two dispersive elements to inputs of the single detector array.

In at least some embodiments, the single detector array may be on a second substrate of a different chip and an edge of the first substrate may be directed to a face of the second substrate in order to capture the two or more pluralities of narrowband optical signals at inputs of the single detector array.

In at least some embodiments, the single detector array may be on a second substrate of a different chip and a face of the first substrate may be directed to a face of the second substrate in order to capture the two or more pluralities of narrowband optical signals at inputs of the single detector array.

In at least some embodiments, the single detector array may be located on the first substrate.

The various embodiments of the spectrometers described herein may generally comprise readout electronics to receive the measurements from the single detector array and generate output samples therefrom having a desired output data format.

In at least some embodiments, the readout electronics may be located on the first substrate.

In at least some embodiments, the single detector array may be located on a different substrate than the first substrate and one or more lenses may be located between the first substrate and the single detector array to refocus the two or more pluralities of narrowband optical signals and to improve coupling efficiency.

In another broad aspect, at least one embodiment described herein provides a method of measuring two or more pluralities of spatially separated spectral components, the method comprising receiving at least one input optical signal; generating two or more pluralities of spatially separated spectral components from the at least one input optical signal by providing the at least one input optical signal to at least two dispersive elements where at least a portion of the at least two dispersive elements is implemented on a first substrate; deriving two or more pluralities of narrowband optical signals from the two or more pluralities of spatially separated spectral components, respectively; and measuring the two or more pluralities of spatially separated spectral components with a single detector array.

In at least some embodiments, the at least two dispersive elements comprise first and second dispersive elements and the method further comprises receiving a first input optical signal at the first dispersive element disposed on the first substrate; generating a first plurality of spatially separated spectral components with the first dispersive element; receiving a second input optical signal at the second dispersive element disposed on the first substrate; and generating a second plurality of spatially separated spectral components with the second dispersive element.

In at least some embodiments, the method further comprises receiving an initial input optical signal as the at least one input optical signal at a polarization splitter; generating the first input optical signal to have a first polarization state over an operating bandwidth range using the polarization splitter; generating the second input optical signal to have the second polarization state over the operating bandwidth range using the polarization splitter; generating the first plurality of spatially separated spectral components having the first polarization state with the first dispersive element; and generating the second plurality of spatially separated spectral components having the second polarization state with the second dispersive element.

In at least some embodiments, the at least two dispersive elements are configured to share a common footprint in a polarization-splitting grating configuration implemented on the first substrate, the polarization-splitting grating configuration having a difference in effective indices of refraction for first and second polarization states over an operating bandwidth range and the method comprises receiving an initial input optical signal as the at least one input optical signal at the polarization-splitting grating configuration; and spatially separating the initial input optical signal into a first plurality of spatially separated signals having a first polarization state and a second plurality of spatially separated signals having a second polarization state.

In at least some embodiments, the method comprises spatially separating the two polarization states of the initial input optical signal such that a minimum output angle of the first plurality of spatially separated spectral components having the first polarization state is larger than a maximum output angle of the second plurality of spatially separated spectral components having the second polarization state over the operating bandwidth range.

In at least some embodiments, the polarization-splitting grating configuration has a difference in effective indices of refraction for the first and second polarization states such that the first plurality of spatially separated spectral components having the first polarization state is disposed along a first portion of an output of the polarization-splitting grating configuration and the second plurality of spatially separated spectral components having the second polarization state is disposed along a second portion of the output different than the first portion.

In at least some embodiments, the first plurality of spatially separated spectral components having the first polarization state may be disposed along a first portion of an output focal curve of the polarization-splitting grating configuration and the second plurality of spatially separated spectral components having the second polarization state may be disposed along a second portion of the output focal curve different than the first portion.

In yet another broad aspect, at least one embodiment described herein provides a spectrometer for measuring spectral components of at least one input optical signal, wherein the spectrometer comprises at least one dispersive element configuration adapted to spatially separate at least a first portion of the at least one input optical signal into a first plurality of spatially separated spectral components having a first polarization state and at least a second portion of the at least one input optical signal into a second plurality of spatially separated spectral components having a second polarization state, the at least one dispersive element configuration being adapted to operate over an operating bandwidth range with at least a portion of the at least one dispersive element configuration being implemented on a first substrate; and a detector array coupled to the at least one dispersive element configuration and configured to receive and measure data related to a first and a second plurality of narrowband optical signals derived from the first and second plurality of spatially separated spectral components, respectively.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

Figure 1:
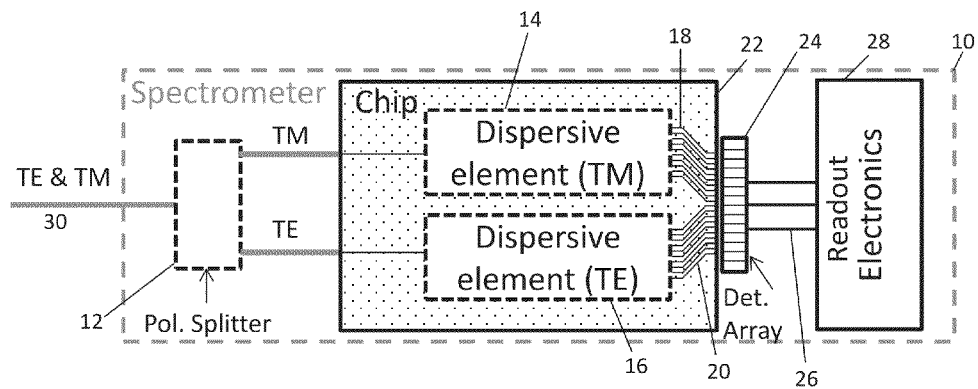
FIG. 1 is a block diagram of an example embodiment of a polarization-sensitive spectrometer.

Various apparatuses or processes will be described below to provide an example of an embodiment of the each claimed subject matter. No embodiment described below limits any claimed subject matter and any claimed subject matter may cover processes or apparatuses that differ from those described below. The claimed subject matter are not limited to apparatuses or processes having all of the features of any one apparatus or process described below or to features common to multiple or all of the apparatuses or processes described below. It is possible that an apparatus or process described below is not an embodiment of any claimed subject matter. Any subject matter disclosed in an apparatus or process described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the description of the embodiments presented herein. Also, the description is not to be considered as limiting the scope of the embodiments described herein in any way, but rather as merely describing the implementation of various embodiments as described.

It should be noted that the terms or phrases "an embodiment," "embodiment," "embodiments," "the embodiment", "the embodiments", "one or more embodiments", "some embodiments", "at least one embodiment", "at least some embodiments" and "one embodiment" mean "one or more (but not all) embodiments of the present subject matter", unless expressly specified otherwise.

It should also be noted that the terms "including", "comprising" and variations thereof mean "including but not limited to", unless expressly specified otherwise. A listing of items does not imply that any or all of the items are mutually exclusive, unless expressly specified otherwise.

It should also be noted that the terms coupled or coupling as used herein can have several different meanings depending in the context in which the term is used. For example, the terms coupled or coupling can have at least one of a mechanical, electrical or optical, connotation. For example, depending on the context, the terms coupled or coupling may indicate that two elements or devices can be at least one of physically, electrically or optically directly connected to one another or they may be linked to one another through one or more intermediate elements or devices via at least one of a physical, an electrical or an optical connection such as, but not limited to a wire, a fiber optic cable or a waveguide, for example.

It should be noted that terms of degree such as "substantially", "about" and "approximately" as used herein mean a reasonable amount of deviation of the modified term such that the end result is not significantly changed. These terms of degree should be construed as including a deviation of up to a certain amount of the modified term if this deviation would not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about." The term "about" means a deviation of up to plus or minus a certain amount of the number to which reference is being made without negating the meaning of the term that it modifies.

Furthermore, in the following passages, different aspects of the embodiments are defined in more detail. Each aspect so defined may be combined with any other aspect or aspects unless clearly indicated to the contrary. In particular, any feature indicated as being preferred or advantageous may be combined with at least one other feature or features indicated as being preferred or advantageous.

An optical spectrometer typically receives one input optical signal and measures the wavelength content of that optical signal over a particular operating wavelength range with a particular spectral resolution or dispersion. Conventionally, multiple spectrometers must be constructed in order to measure multiple optical signals, multiple spectral resolutions, multiple operating bandwidth ranges, or multiple optical characteristics besides wavelength such as polarization, for example. The cost and size of a collection of multiple spectrometers tend to increase linearly, e.g. three spectrometers cost three times as much as one spectrometer and take up three times the space. This scaling is driven in large part by the requirement for one camera (containing one detector array plus readout electronics) per spectrometer, plus the associated data connections and computing requirements to support multiple cameras.

This scaling of cost and size prohibits the practical implementation of many useful collections of spectrometers. In many cases, it is desirable to create a multi-function spectrometer with a single detector array which can perform multiple functions with little increase in size or cost compared to a single-function spectrometer. For example, in some cases an optical signal may have spectral features at multiple wavelength ranges such that it is desirable to measure each wavelength range independently, potentially with a different spectral resolution in each wavelength range. In some cases, multiple optical signals might be collected from multiple samples or from multiple areas on the same sample, and it is desirable to measure the wavelength content of all the optical signals at once with the same synchronized trigger event. In still other cases, it is desirable to measure the wavelength content of two optical signals which are output from an interferometer to implement a balanced detection scheme.

Various embodiments according to the teachings described herein have been newly discovered that can be used to implement a multi-function spectrometer with a single detector array.

In some cases, it is desirable to create a polarization-sensitive spectrometer that can independently measure the spectral components of both polarizations of an input optical signal. For example, Polarization-Sensitive Optical Coherence Tomography (PS-OCT) is an imaging technique that can provide enhanced image contrast between tissues or materials with different polarization-altering properties. Spectral Domain PS-OCT (SD-PS-OCT) is preferred over Time Domain PS-OCT due to the speed of data capture. Data capture in SD-PS-OCT can be performed with a polarization-sensitive spectrometer.

However, conventional SD-PS-OCT systems are typically large and expensive due to the use of only free-space optic components and the need for at least one of multiple cameras, multiple beam splitters, and multiple wave plates, for example, and the costs of accurately aligning and calibrating these systems. For instance, the traditional measurement approach for SD-PS-OCT includes a polarization beam splitter to separate an input optical signal into two polarization components, followed by two independent spectrometers to measure the polarization components in parallel. The requirement for two spectrometers, and in particular two line-scan cameras, adds significantly to system cost. Accordingly, a polarization-sensitive spectrometer that uses only one camera will reduce costs. Similarly, the incremental cost of adding a second spectrometer to a chip, as described in some embodiments here, will be considerably less than that of acquiring a second free-space optical spectrometer.

Generally speaking, the polarization of a polarized input optical signal may be decomposed into any two orthogonal basis states to describe an elliptical polarization. Two specific cases of an elliptical polarization are a circular polarization and a linear polarization. Measurement of the polarization state of a polarized input light signal can be accomplished by measuring the intensities of two orthogonal basis states, for example using a polarization-sensitive spectrometer. An incoherent or partially polarized input optical signal may be described more completely by the Stokes parameters. Measurement of the Stokes parameters may include multiple manipulations of the state of the input optical signal combined with multiple measurements using a polarization-sensitive spectrometer. In the following description an input optical signal is measured as the combination of two linearly polarized orthogonal basis states. In other embodiments, other polarization states can be measured by a polarization-sensitive spectrometer such as right-hand circularly polarized and left-hand circularly polarized orthogonal basis states, for example.

The challenges with conventional PS-OCT systems that are based on free-space optical components can be overcome by building simpler polarization-sensitive spectrometers, as described herein, with a single detector array or camera by locating two or more dispersive elements on a planar substrate (also referred to as an integrated circuit, a wafer or a chip). An optical system that is at least partially implemented on a chip includes planar optical waveguides on the surface of the chip to route and process optical signals. Integrated optical components are at least partially sensitive to the polarization of an input optical signal. For example, the polarization states of an input optical signal in an integrated waveguide with a substantially rectangular cross-section may be described as being the quasi transverse electric ("TE") and quasi transverse magnetic ("TM") polarization states (also known as modes).

In an integrated waveguide, the TE and TM modes have a different effective index $n_{eff}$ or propagation speed $c/n_{eff}$ due to differences in geometry or refractive index between the vertical cross-section and the horizontal cross-section of the waveguide. The difference in effective index is referred to as birefringence which can be represented mathematically as shown in equation 1:

$$\Delta n_{\text{eff}} = n_{\text{eff,TE}} - n_{\text{eff,TM}} \qquad (1)$$

where $\Delta n_{\text{eff}}$ is the difference in effective index of refraction due to birefringence, $n_{\text{eff,TE}}$ is the effective index of refraction for the TE mode and $n_{\text{eff,TM}}$ is the effective index of refraction for the TM mode. Birefringence causes the TE and TM modes to propagate differently through an integrated optical structure. Accordingly, two dispersive elements can be designed with one each for the TE and TM polarization states. In some embodiments, the two dispersive elements can then be overlaid to utilize the same footprint and the same grating (i.e. the two dispersive elements have a common footprint and a common grating). This combination of two dispersive elements is defined and referred herein as a polarization-splitting grating configuration. In some cases, this arrangement may be alternatively referred to as at least one dispersive element configuration.

In at least some of the various embodiments described herein, an on-chip dispersive element, such as an Arrayed Waveguide Grating (AWG) or a Planar Concave Grating (PCG) for example, is designed such that the TE-polarized portion of light at a given wavelength is directed to different output waveguides than the TM-polarized portion of light at that same wavelength allowing for the simultaneous independent measurement of the spectral content of both polarization components of an input optical signal. As described herein, this can be done by designing the birefringence of an on-chip polarization-splitting grating such that the two polarizations of an optical signal are directed to two output regions and measuring the polarizations of an optical signal with a single array of detectors.

In addition to splitting the polarizations of an input optical signal, at least some of the spectrometers described herein can also be designed such that both polarization components of an input optical signal are well-focused with little or no aberration. By using at least one integrated component, the various embodiments of the spectrometers described herein also reduce the size and cost of SD-PS-OCT systems compared to conventional systems that are based on free-space optical components.

The design and implementation of the dispersive element in at least some of the embodiments described herein is in contrast to several instances of conventional integrated structures that process optical signals since these conventional integrated structures are designed to decrease or eliminate the effective birefringence $\Delta n_{\text{eff}}$ between the two polarization components of an optical signal. In this way, the two polarization components of the optical signal propagate similarly through these conventional integrated structures, and the resulting conventional system is polarization-insensitive.

Another advantage of using integrated optical components is that optical components located on a chip can be pre-aligned with each other during the chip fabrication process, resulting in fewer components that need to be manually aligned during a final assembly process. In particular, optical waveguides on a spectrometer chip (e.g. a chip having at least one dispersive element) can be used to rearrange the outputs from one or more dispersive elements and route them to interface appropriately with a single detector array. Then by aligning the spectrometer chip to a detector array, all of the dispersive element outputs are simultaneously aligned with the inputs of the detector elements of the detector array in a single manufacturing step. This approach significantly reduces the costs and effort associated with constructing a system of multiple free-space optical components which must then be manually aligned, as is done conventionally.

Furthermore, the robustness of the various embodiments described herein lend themselves well to mobile and point-of-care applications where OCT and PS-OCT systems have previously not been used.

Another advantage of using integrated optical components is that the polarization does not need to be controlled at each interaction between a free-space beam and an optical surface for integrated structures. In fact, in the case of an integrated photonic platform, the waveguide structures are polarization preserving, offering a degree of simplicity and design flexibility not possible with free-space designs.

In some embodiments, at least some elements are composed of waveguides formed on a planar substrate. In some embodiments, these waveguides can be comprised of materials that are transparent in the near infrared spectrum in the ranges typically used in OCT systems, such as, but not limited to the 850 nm, 1050 nm or 1310 nm spectral bands in some embodiments. However, it should be appreciated that in other embodiments alternative materials can be chosen that are appropriate for a particular wavelength or range of wavelengths of light. In some of the various embodiments, it can be preferable that the materials used to form waveguides have a high refractive index contrast, such as a core to cladding ratio of 1.05:1 or greater, which can confine light and enable more compact photonic components as compared to materials having a low refractive index contrast.

In some embodiments, waveguides can be comprised of silicon nitride, silicon oxynitride, silicon, SU8, doped glass, other polymers or other suitable materials.

In some embodiments, the integrated elements of these embodiments can be formed on a planar substrate using photolithography. However, it should be understood that photonic circuits can be fabricated by other methods, such as, but not limited to, electron beam lithography or nanoimprint lithography, for example.

In embodiments where elements are formed on a planar substrate using photolithography and where waveguides and other photonic elements on the planar substrate are made of silicon nitride, a standard silicon wafer can be used having several microns of silicon dioxide thermally grown on a top surface of the substrate as a lower waveguide cladding. In at least some of the embodiments described herein, a thickness of 3-4 microns of silicon dioxide can be used; however, it should be understood that other thicknesses can be used and may be appropriately chosen based on the wavelength range of optical input signals to be analyzed and/or processed. In some embodiments, silicon dioxide can be deposited by other techniques such as plasma enhanced chemical vapor deposition. In some embodiments, a material other than silicon dioxide may be used as a lower waveguide cladding.

Silicon nitride can then be deposited onto the planar substrate, and in some embodiments, a few hundred nanometers of stoichiometric silicon nitride can be deposited using low pressure chemical vapor deposition. An anti-reflection coating layer such as, but not limited to, Rohm and Haas AR3 can additionally be applied by spin coating onto the planar substrate, which can enhance the performance of the photolithography process. A UV-sensitive photoresist such as, but not limited to, Shipley UV210 can then be applied by spin coating onto the planar substrate.

The planar substrate can be patterned using a photolithographic patterning tool at an appropriate exposure to expose the resist with a pattern of waveguides and other devices. After being exposed, the planar substrate can be developed with MicroChemicals AZ 726MIF or another suitable developer to remove unexposed resist. A descum process can be used with a plasma etcher to remove residual resist and the pattern in the resist can be reflowed, in some embodiments for several minutes, with a hot plate to smooth out any surface roughness.

The silicon nitride on the planar substrate can be etched using inductively coupled reactive ion etching (ICP RIE) with a $CHF_3/O_2$ recipe. The resist mask used for etching can then be removed in an oxygen plasma or in a resist hot strip bath which contains heated solvents.

The planar substrate can be annealed in a furnace oxide tube, in some embodiments at 1,200° C. for three hours. This can tend to reduce material absorption losses in embodiments where an optical source generates an optical signal at wavelengths that are near infrared.

The planar substrate can then be covered in oxide, which in some embodiments can be done by using high temperature oxide deposited in furnace tubes or by using plasma enhanced chemical vapour deposition. The planar substrate can then be diced and the end facets can be polished which can improve coupling of waveguides and other optical elements formed on the planar substrate. Alternatively, the end facets can be lithographically defined and etched using a deep reactive-ion etching process such as, but not limited to, the Bosch process, for example.

It should be noted that there may be variations to the fabrication techniques described above depending on the particular embodiment of the spectrometer that is being manufactured and/or the particular use of the spectrometer.

Referring now to FIG. 1, shown therein is a block diagram of an example embodiment of a polarization-sensitive spectrometer 10. The spectrometer 10 comprises an off-chip polarization splitter 12, a first dispersive element 14, a second dispersive element 16, a first waveguide array 18, a second waveguide array 20, and a detector array 24 having output lines 26 coupled to readout electronics 28. The first and second dispersive elements 14 and 16 and the first and second waveguide arrays 18 and 20 are implemented on a substrate of an integrated circuit or chip 22. The output of the spectrometer 10 can be used to generate a spectrum of an initial input optical signal 30 as a function of frequency or wavelength.

The initial input optical signal 30 containing one or both of TE and TM polarization components is input to the spectrometer 10. It should be noted that the term input light signal can also be used for the initial input optical signal 30. The polarization splitter 12 is used to spatially separate the two polarization components TM and TE of the initial input optical signal 30. Each of the TM and TE components are then coupled onto the spectrometer chip 22. The splitter 12 may be implemented using free-space optics, fiber optics, or a separate photonic chip. For example, the splitter 12 may be a polarization beam splitter or a fiber optic polarization splitter.

The first and second dispersive elements 14 and 16 are preferably optimized for use with a particular polarization, for example by considering the effective index $n_{eff}$, group index $n_g$, and waveguide mode size of the desired polarization. Accordingly, the first dispersive element 14 generates a plurality of spatially separated spectral components having TM polarization components representative of the spectrum of the TM input optical signal. The second dispersive element 16 generates a plurality of spatially separated spectral components having TE polarization components representative of the spectrum of the TE input optical signal. Examples of on-chip dispersive elements that can be used include, but are not limited to, Arrayed Waveguide Gratings (AWGs) and Planar Concave Gratings (PCGs).

The waveguide array 18 has a plurality of waveguides that are arranged to capture a plurality of narrowband optical signals having TM polarization components and route these signals in an appropriate manner to interface with a first portion of detector pixels (also known as detector elements) from the detector array 24. For example, the detector array 24 typically comprises a linear array of detector elements in which case the output ports of the plurality of waveguides of the waveguide array 18 are arranged with a linear pitch at the edge of the spectrometer chip 22 that interfaces with the detector array 24. In some embodiments, each narrowband signal may be absorbed and detected by a single detector pixel in the detector array 24. In alternative embodiments, each narrowband signal may be absorbed and detected by multiple detector pixels in the detector array 24.

The waveguide array 20 has a plurality of waveguides that are arranged to capture a plurality of narrowband optical signals having TE polarization components and route these signals in an appropriate manner (as described for waveguide array 18) to interface with a second portion of detector pixels from the detector array 24 that is different from the first portion of detector pixels.

This embodiment holds an advantage over conventional free-space optic systems because the waveguide arrays 18 and 20 can be precisely aligned to the dispersive elements 14 and 18 during the chip manufacturing process, such that aligning the chip 22 to the detector array 24 automatically aligns the dispersive elements 14 and 16, the waveguide arrays 18 and 20 and the inputs of the detector array 24. This is not possible with conventional free-space optic systems.

In an alternative embodiment, the dispersive elements 14 and 16 can directly illuminate the detector pixels of the detector array 24 without the use of the waveguide arrays 18 and 20, respectively. In this case, the detector elements of the detector array 24 capture a first and a second plurality of narrowband optical signals having TM and TE polarization components, respectively. This embodiment also holds an advantage over conventional free-space optic systems because the dispersive elements 14 and 16 can be precisely aligned to each other and to the outputs of the chip 22 during the chip manufacturing process, such that aligning the outputs of the chip 22 to the inputs of the detector array 24 automatically aligns both of the dispersive elements 14 and 16 to the detector array 24.

The detector array 24 is an array of detector elements such as, but not limited to, surface-illuminated detector pixels or integrated waveguide photodetectors, for example, that are arranged to receive and measure the plurality of narrowband optical signals derived from the dispersive elements 14 and 16 thereby measuring specific information about the initial input optical signal 30. Typically, the detector elements are linearly arranged to provide a linearly spaced array of detector elements and each narrowband optical signal from the waveguide arrays 18 and 20 illuminate one or more detector elements. To facilitate this, the inputs of the detector array 24 are precisely aligned with the outputs of the chip 22.

Generally, the detector array 24 shown in the various embodiments herein is a single detector array. However, there may be some alternative embodiments where it may be beneficial to use more than one detector array.

The data measured by the detector array 24 are provided to the readout electronics 28 via the output lines 26, which can be conductive traces on a chip or electrical wires depending on the particular implementation. The readout electronics 28 are used to convert the electrical signals generated (i.e. representing measured data) by the detector array 24 into output data having a suitable format that can be used by a computing device (not shown) to analyze the output data such as, for example, by computing an inverse Fourier transform of the output data. In some embodiments, the readout electronics 28 includes a Field Programmable Gate Array or a microcontroller that provides clock and control signals to the detector array 24 in order to read the measured data from the detector array 24 and then format the measured data using a suitable output data format. For example, the output data format can be a USB format so that a USB connection can be used between the readout electronics 28 and the computing device. In some embodiments, another format such as a Camera Link or a Gigabit Ethernet connection can be used. In some embodiments, if the detector array 24 generates output analog signals, then the readout electronics 28 also includes a suitable number of analog to digital converters with a suitable number of channels.

It should be noted that collectively, the polarization splitter 12, and the dispersive elements 14 and 16 can be referred to as at least two dispersive elements that are configured to receive an input optical signal and spatially separate the input optical signal into a first plurality of spatially separated spectral components having a first polarization state and a second plurality of spatially separated spectral components having a second polarization state over an operating bandwidth range.

Figure 2:
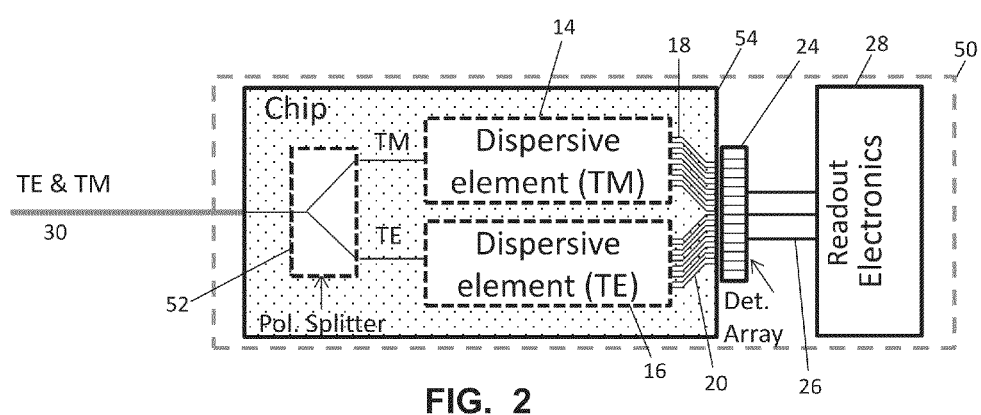
FIG. 2 is a block diagram of another example embodiment of a polarization-sensitive spectrometer.

Referring now to FIG. 2, shown therein is a block diagram of another example embodiment of a polarization-sensitive spectrometer 50.

The spectrometer 50 is similar to the spectrometer 10 except that the spectrometer 50 comprises an on-chip polarization splitter 52. The on-chip polarization splitter 52 can be, but is not limited to, a waveguide polarization splitter, for example. The on-chip polarization splitter 52 is located on the same chip 54 as the dispersive elements 14 and 16 and the waveguide arrays 18 and 20. The spectrometer 50 operates in a similar manner as the spectrometer 10. However, the spectrometer 50 is preferable to the spectrometer 10 since only the single initial input optical signal 30 is aligned with the chip 54 compared to both of the TM and TE input optical signals for the chip 22. In addition, the overall spectrometer 50 can be smaller and less expensive than the spectrometer 10 due to the reduced number of components and the reduced alignment requirements.

It should be noted that collectively, the polarization splitter 52, and the dispersive elements 14 and 16 can be referred to as at least two dispersive elements that are configured to receive an input optical signal and spatially separate the input optical signal into a first plurality of spatially separated spectral components having a first polarization state and a second plurality of spatially separated spectral components having a second polarization state over an operating bandwidth range.

Figure 3:
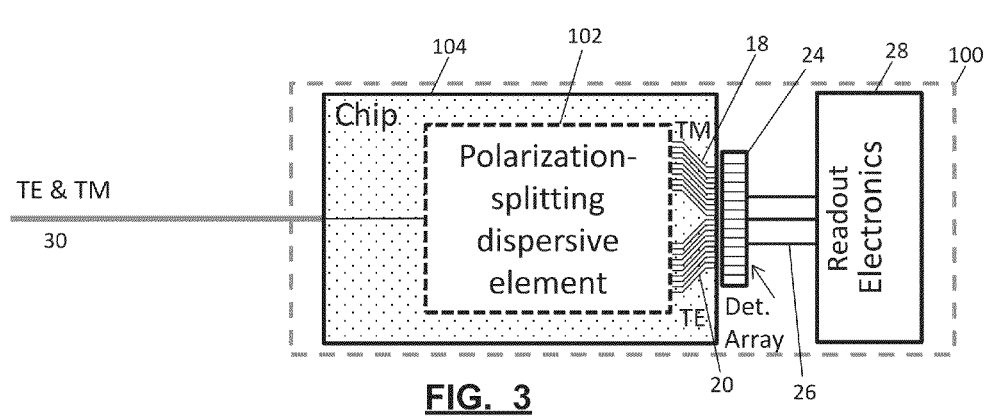
FIG. 3 is a block diagram of another example embodiment of a polarization-sensitive spectrometer.

Referring now to FIG. 3, shown therein is a block diagram of another example embodiment of a polarization-sensitive spectrometer 100. The spectrometer 100 comprises two dispersive elements, one designed for each polarization, that are overlaid to share a common footprint in a polarization-splitting grating configuration 102 that can provide both the dispersion and polarization-splitting functions. The polarization-splitting grating configuration 102 is implemented on a chip 104 along with the waveguide arrays 18 and 20. As with the spectrometer 50, only an initial input optical signal 30 is aligned with the chip 104. This embodiment can be enabled by using a polarization-dependent effective index $n_{eff}$ which can be engineered in waveguide structures based on the geometry of the waveguide structures and the materials used in the waveguide structures, as one example. This spectrometer 100 is preferable to the spectrometers 10 and 50 since the spectrometer 100 does not require a separate polarization-splitting component and the combined footprint of the two dispersive elements can be reduced.

It should be noted that the polarization-splitting grating configuration 102 can be seen as at least two dispersive elements that are configured to receive an input optical signal and spatially separate the input optical signal into a first plurality of spatially separated spectral components having a first polarization state and a second plurality of spatially separated spectral components having a second polarization state over an operating bandwidth range.

Figure 4A:
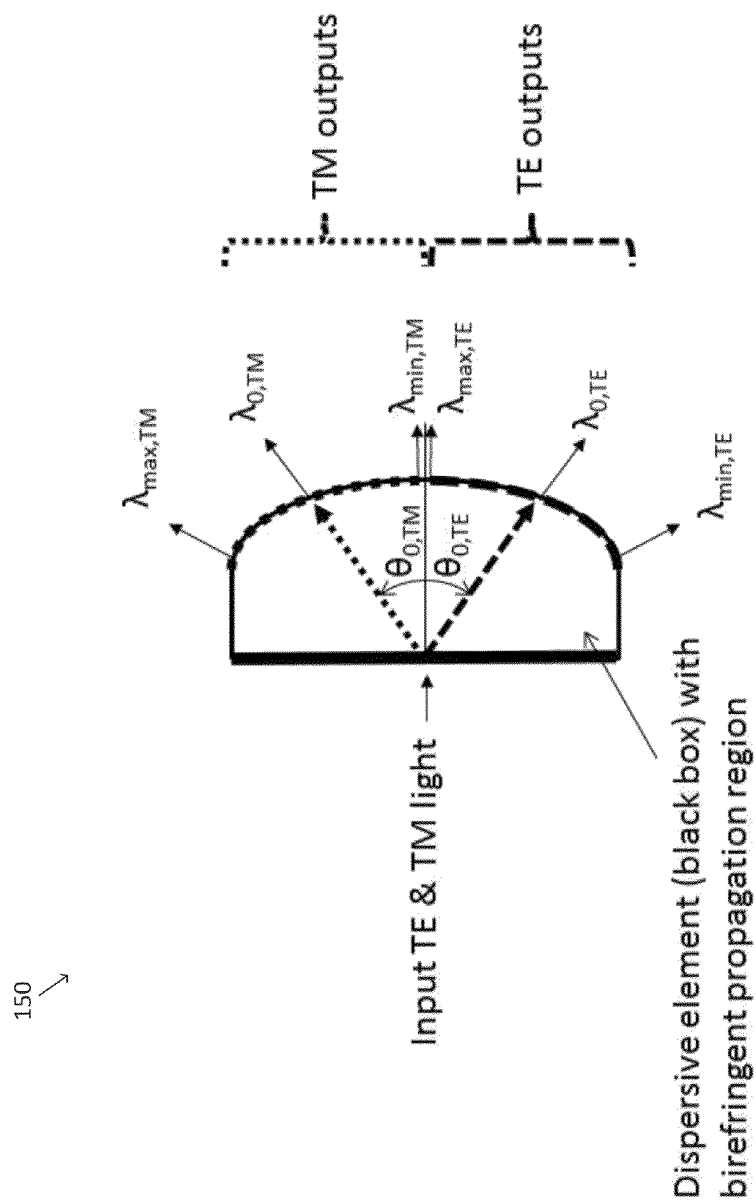
FIG. 4A is a diagram of a polarization-splitting grating configuration that can provide both dispersion and polarization-splitting functions.

Referring now to FIG. 4A, shown therein is a diagram of a polarization-splitting grating configuration 150 that can provide both dispersion and polarization-splitting functions. The polarization-splitting grating configuration 150 is constructed from a first dispersive element operating for the effective index of the TE polarization and directing the outputs to a TE output region, and a second dispersive element operating for the effective index of the TM polarization and directing the outputs to a TM output region. In this case, the two dispersive elements are configured to overlap with each other and share a common footprint. When provided with an input optical signal having both TE and TM components, the wavelengths of the TM output optical signals do not spatially overlap with the wavelengths of the TE output optical signals.

Figure 4B:
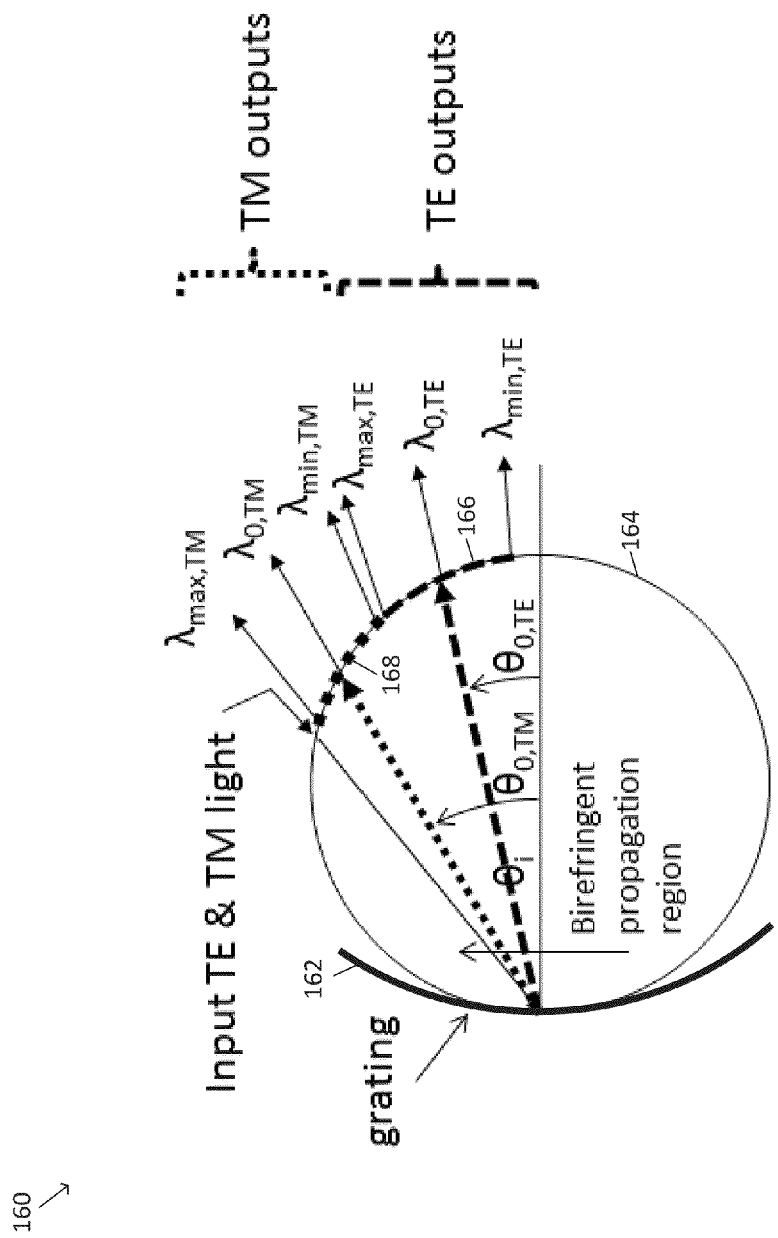
FIG. 4B is a schematic of a Planar Concave Grating (PCG) polarization-splitting grating that provides both dispersion and polarization-splitting functions.

An example embodiment of the polarization-splitting grating configuration 150 is a PCG polarization-splitting grating 160 shown in FIG. 4B. The PCG polarization-splitting grating 160 has an output focal curve 164. The PCG polarization-splitting grating 160 is constructed from a first dispersive element that has an effective index for the TE polarization and directs the outputs to a first portion 166 of the output focal curve 164, and a second dispersive element that has an effective index for the TM polarization and directs the outputs to a second portion 168 of the output focal curve 164, wherein the two dispersive elements are configured to overlap with each other and share a common footprint. It can be seen that there is no overlap between the first and second portions 166 and 168.

In other embodiments, the PCG polarization-splitting grating 160 may be constructed from a first dispersive element that has an effective index for the TE polarization and directs the outputs to a first portion of an output of the PCG polarization-splitting grating 160, and a second dispersive element that has an effective index for the TM polarization and directs the outputs to a second portion of the output of the PCG polarization-splitting grating 160, where the first and second portions of the output may be near but not necessarily on the output focal curve of the PCG polarization-splitting grating 160.

Figure 4C:
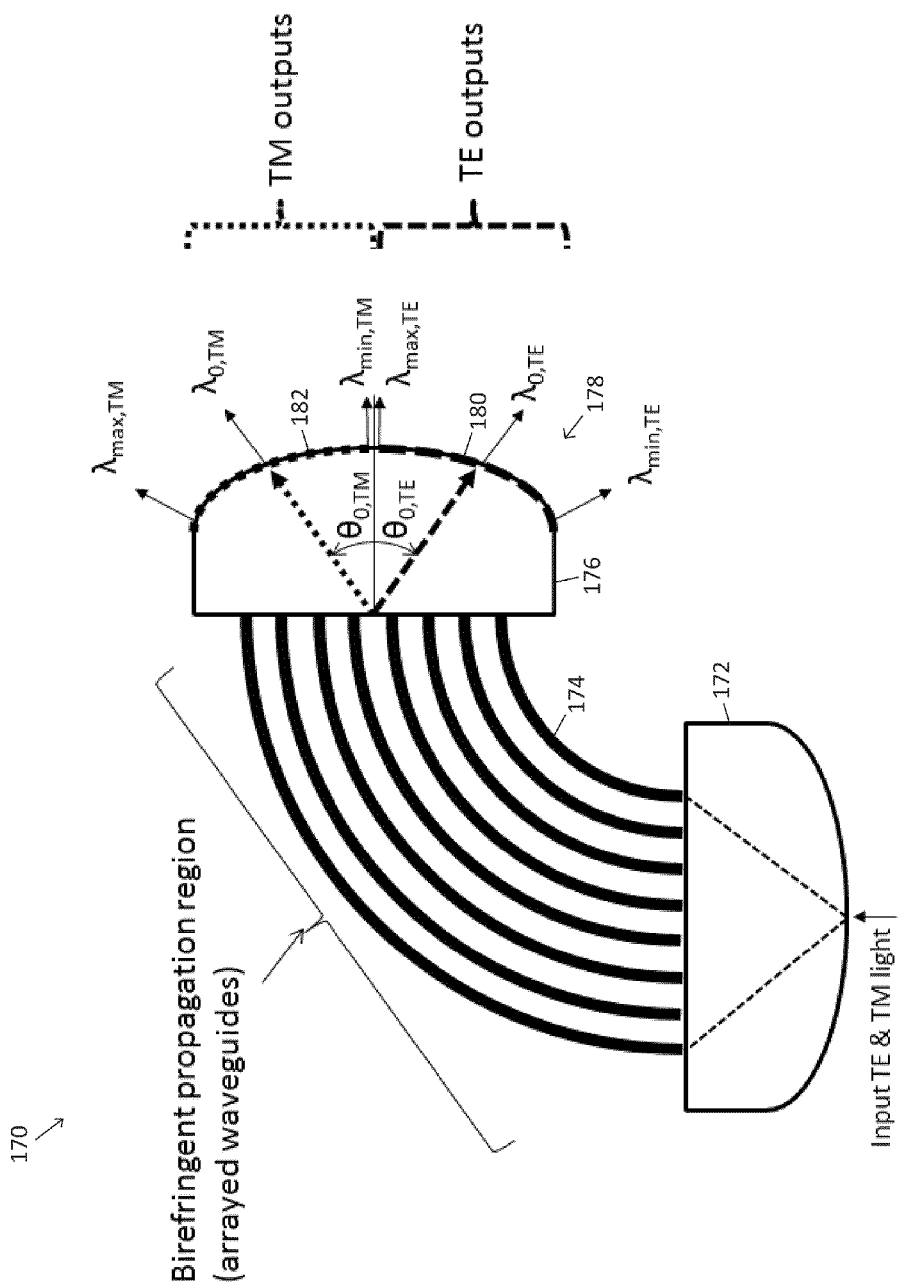
FIG. 4C is a schematic of an Arrayed Waveguide Grating (AWG) polarization-splitting grating that provides both dispersion and polarization-splitting functions.

Another example embodiment of the polarization-splitting grating configuration 150 is an AWG polarization-splitting grating 170 shown in FIG. 4C. The AWG polarization-splitting grating 170 has an input free propagation region 172, a plurality of waveguides 174 and an output free propagation region 176 such that there is an output focal curve 178. In the input free propagation region 172, the light of an input optical signal spreads out to illuminate the plurality of waveguides 174 and travel along different path lengths to the output free propagation region 176 where the optical signals are focused to the outputs of the AWG polarization-splitting grating 170. The AWG polarization-splitting grating 170 is constructed from a first dispersive element that has an effective index of the TE polarization and directs the outputs to a first portion 180 of the output focal curve 178, and a second dispersive element operating that has an effective index for the TM polarization and directs the outputs to a second portion 182 of the output focal curve 178, wherein the two dispersive elements are configured to overlap with each other and share a common footprint. It can be seen that there is no overlap between the first and second portions 180 and 182.

In other embodiments, the AWG polarization-splitting grating 170 may be constructed from a first dispersive element that has an effective index for the TE polarization and directs the outputs to a first portion of an output of the AWG polarization-splitting grating 170, and a second dispersive element that has an effective index for the TM polarization and directs the outputs to a second portion of the output of the AWG polarization-splitting grating 170, where the first and second portions of the output may be near but not necessarily on the output focal curve of the AWG polarization-splitting grating 170.

To determine whether polarization splitting can be implemented by two dispersive elements sharing a common footprint in a polarization-splitting grating configuration, one must consider the total operating bandwidth of the spectrometer. The total bandwidth available in a spectrometer based on a polarization-splitting grating can be described mathematically as follows, starting with the grating equation shown in equation 2.

$$d(\sin\theta_i + \sin\theta_m) = m\lambda/n_{eff} \tag{2}$$

In Equation 2, d is grating pitch, $\theta_i$ is input angle of an input optical signal, $\theta_m$ is output angle of an output optical signal, m is mode order, $\lambda$ is wavelength of the output optical signal and $n_{eff}$ is the effective index (which is in general a function of wavelength). For a central wavelength $\lambda_0$, the output angle for the TM mode with an effective index $n_{eff,TM}(\lambda_0)$ is given by equation 3:

$$\theta_{0,TM} = \sin^{-1}\left(\frac{m\lambda_0}{dn_{eff,TM}(\lambda_0)} - \sin\theta_i\right) \tag{3}$$

and the output angle for the TE mode with an effective index $n_{eff,TE}(\lambda_0)$ is given by equation 4.

$$\theta_{0,TE} = \sin^{-1}\left(\frac{m\lambda_0}{dn_{eff,TE}(\lambda_0)} - \sin\theta_i\right) \tag{4}$$

The difference between the output angles is given by equation 5:

$$\Delta\theta_0 = \theta_{0,TM} - \theta_{0,TE} \tag{5}$$

and can be used to provide a separation of the TE and TM polarization components at a single wavelength $\lambda_0$.

For the spectrometer 100 to operate with high fidelity over an operating spectral range $\Delta\lambda_{spec} = \lambda_{max} - \lambda_{min}$, it is desired that the TM minimum wavelength be separated from the TE maximum wavelength, or in other words $\theta_{min,TM} > \theta_{max,TE}$, as is shown in FIGS. 4A-4C for several different example embodiments. These equations are derived for the case in which $n_{eff,TM} < n_{eff,TE}$. It should be noted that similar equations can be derived for the case in which $n_{eff,TM} > n_{eff,TE}$.

Therefore, in this example embodiment, a TE dispersive element and a TM dispersive element are combined in a polarization-splitting grating configuration exhibiting the following:

$$\theta_{min,TM} > \theta_{max,TE} \tag{6}$$

$$\sin^{-1}\left(\frac{m\lambda_{min}}{dn_{eff,TM}(\lambda_{min})} - \sin\theta_i\right) > \sin^{-1}\left(\frac{m\lambda_{max}}{dn_{eff,TE}(\lambda_{max})} - \sin\theta_i\right) \tag{7}$$

$$\frac{m\lambda_{min}}{dn_{eff,TM}(\lambda_{min})} - \sin\theta_i > \frac{m\lambda_{max}}{dn_{eff,TE}(\lambda_{max})} - \sin\theta_i \tag{8}$$

$$\frac{\lambda_{min}}{n_{eff,TM}(\lambda_{min})} > \frac{\lambda_{max}}{n_{eff,TE}(\lambda_{max})} \tag{9}$$

A polarization-splitting grating configuration can therefore be designed to operate over a desired spectral range between $\lambda_{min}$ and $\lambda_{max}$ by engineering appropriate values of the effective index for the TM mode $n_{eff,TM}$ and the effective index for the TE mode $n_{eff,TE}$. This can be done by appropriate design of the geometry and materials used in the region of the polarization-splitting grating configuration shared by the two dispersive elements.

Figure 5A:
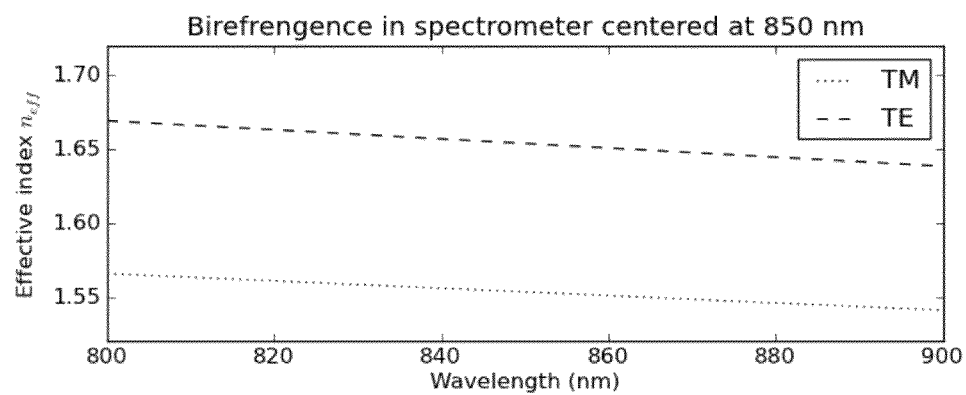
FIGS. 5A-5D are diagrams illustrating the birefrengence versus wavelength and bandwidth as well as the relation between bandwidth and wavelength for a polarization-sensitive spectrometer that uses an example embodiment of a PCG polarization-splitting grating to provide both dispersion and polarization-splitting functions.
Figure 5B:
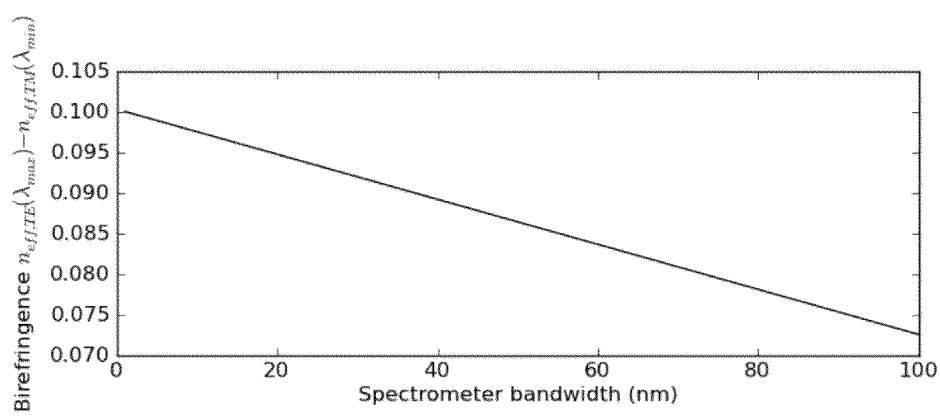
Figure 5C:
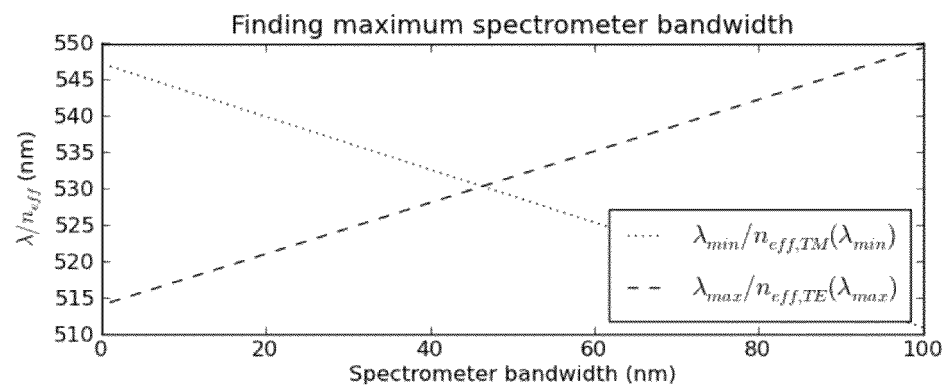
Figure 5D:
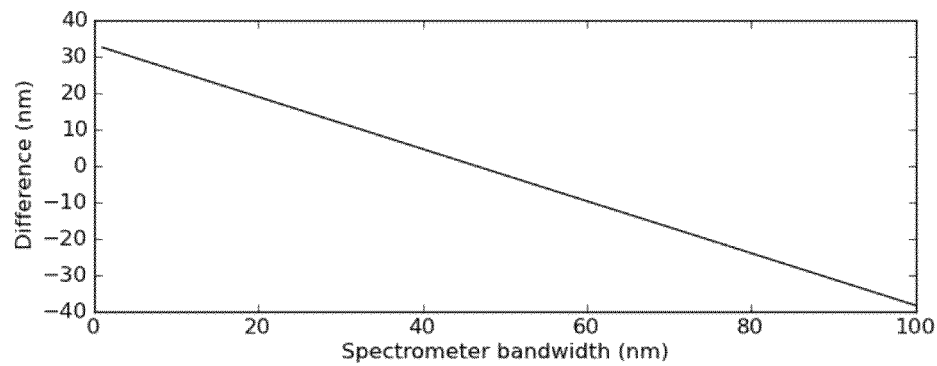

As an example, FIGS. 5A-5D show diagrams illustrating the birefringence versus wavelength and bandwidth as well as the relation between bandwidth and wavelength for a polarization-sensitive spectrometer that uses an example embodiment of a PCG polarization-splitting grating to provide both the dispersion and polarization-splitting functions. In particular, FIGS. 5A-5B show the calculated birefringence for a shared propagation region consisting of a 150 nm thick slab of silicon nitride surrounded by silicon dioxide in a slab waveguide PCG device. FIGS. 5C-5D show a 46 nm bandwidth that is achievable while completely splitting the polarizations for this same slab waveguide PCG device. These results were obtained by using modal effective index simulations performed using a Finite Element Method (FEM) mode solver. The bandwidth can be raised or lowered by altering the geometry and the material refractive indices of the slab waveguide PCG device. For example, in some embodiments, the waveguide core, bottom cladding, and top cladding can be comprised of various materials such as, but not limited to silicon nitride, silicon oxide, silicon oxynitride, silicon-rich silicon nitride, silicon, SU8, doped glass, other polymers, or other suitable materials, for example. In general, more contrast in effective indices for the TE and TM polarization components leads to a larger amount of splitting of the TE and TM polarization components and a larger achievable bandwidth for the polarization-splitting grating configuration and the spectrometer system.

In a more general case, the TE and TM dispersive elements could also be operating at different grating mode orders $m_{TE}$ and $m_{TM}$. In that case, the polarization-splitting grating can be designed to satisfy the condition shown in equation 10.

$$\frac{m_{TM}\lambda_{min}}{n_{eff,TM}(\lambda_{min})} > \frac{m_{TE}\lambda_{max}}{n_{eff,TE}(\lambda_{max})} \tag{10}$$

Figure 6:
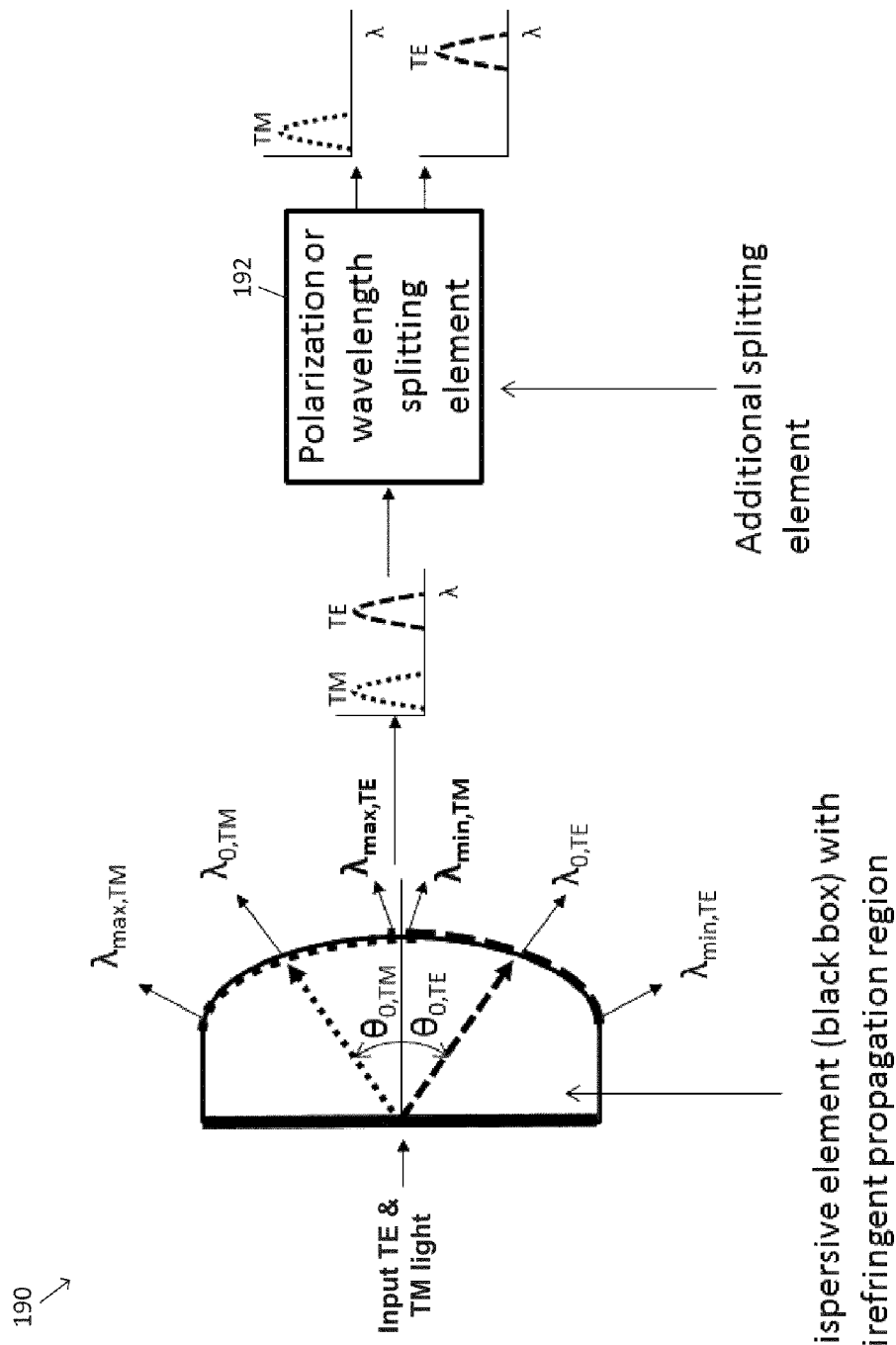
FIG. 6 illustrates a scenario of incomplete polarization-splitting when the bandwidth of the input optical signal is larger than the maximum bandwidth of a polarization-splitting grating configuration in which case a secondary polarization-splitting element or wavelength-splitting element can be used for complete separation of the polarization components of the input optical signal.

Referring now to FIG. 6, it should be noted that there may also be cases in which the bandwidth of the input optical signal to a polarization-splitting grating configuration 190 is larger than its maximum bandwidth, in which case the output polarization signals are not completely separated and some of the center-most outputs will contain a TE narrowband optical signal at one wavelength and a TM narrowband optical signal at another wavelength. In other words, in these cases, there will be an overlap in wavelength in the TE and TM outputs of the polarization-splitting grating configuration 190. This overlap is due to the fact that the TE and TM outputs at these wavelengths arrived in the same output of the polarization-splitting grating configuration 190 because they experienced the same effective index $n_{eff}$ within the polarization-splitting grating configuration 190. In this case, a secondary splitting element 192 based on either polarization or wavelength may be used to completely separate the TE and TM output signals. While this adds complexity to the spectrometer, it could be used if the maximum splitting bandwidth (as calculated above) is insufficient for a given application.

As previously mentioned, it is also possible to use a polarization-splitting grating configuration to independently focus the two polarization components of an input optical signal in addition to splitting them. To accomplish this, the polarization-splitting grating configuration can be designed by requiring the grating facets, numbered by integers i, to have center locations $(x_i, y_i)$ that satisfy the two constraint conditions shown in equations 11 and 12.

$$\epsilon_{1,i}(x_i,y_i)=0; \epsilon_{2,i}(x_i,y_i)=0 \qquad (11, 12)$$

An example of a constraint function that can be used to create a grating with a particular stigmatic or aberration-free output point for a wavelength $\lambda_0$ is shown in equation 13.

$$\varepsilon_{1,i}(x, y) = r_1 + r_2 + \frac{im\lambda_0}{n_{eff}} - r_{1,0} - r_{2,0} \qquad (13)$$

In equation 13 i is an integer, $r_1$ is the distance between the input point $(\alpha_1, b_1)$ and an arbitrary point $(x, y)$, $r_2$ is the distance between the output point $(a_2, b_2)$ and $(x, y)$, $r_{1,0}$ is the distance between $(a_1, b_1)$ and the grating pole $(x_0, y_0)$, and $r_{2,0}$ is the distance between $(x_0, y_0)$ and $(a_2, b_2)$. In other words, a constraint function of this form guarantees that the grating facets are placed to provide aberration-free focusing of the wavelength $\lambda_0$ onto the output point $(a_2, b_2)$. Specifically, each facet is positioned to provide an optical path length difference of $m\lambda_0/n_{eff}$ along the optical path from the input to the facet to the output, compared to adjacent facets.

The two constraint functions can be used to generate two separate stigmatic output points for the central wavelength $\lambda_0$ for each polarization component according to equation 14 for the TM output located at position $(a_2,b_2)_{TM}$ and equation 15 for the TE output located at position $(a_2,b_2)_{TE}$.

$$\varepsilon_{1,i}(x, y) = r_1 + r_{2,TM} + \frac{im\lambda_0}{n_{eff,TM}} - r_{1,0} - r_{2,0,TM} \qquad (14)$$

$$\varepsilon_{2,i}(x, y) = r_1 + r_{2,TE} + \frac{im\lambda_0}{n_{eff,TE}} - r_{1,0} - r_{2,0,TE} \qquad (15)$$

In other words, aberration-free focusing of both polarizations is provided by solving for facet positions that simultaneously satisfy both equations for the TE dispersive element and the TM dispersive element. Each facet is positioned to simultaneously provide an optical path length difference of $m_{TE}\lambda_0/n_{eff,TE}$ and $m_{TM}\lambda_0/n_{eff,TM}$ compared to adjacent facets. By combining engineered polarization-splitting with engineered polarization focusing, by using the equations shown herein for example, one can create a spectrometer which separates and measures the two polarization components of an input optical signal with high performance and high efficiency.

Figure 7A:
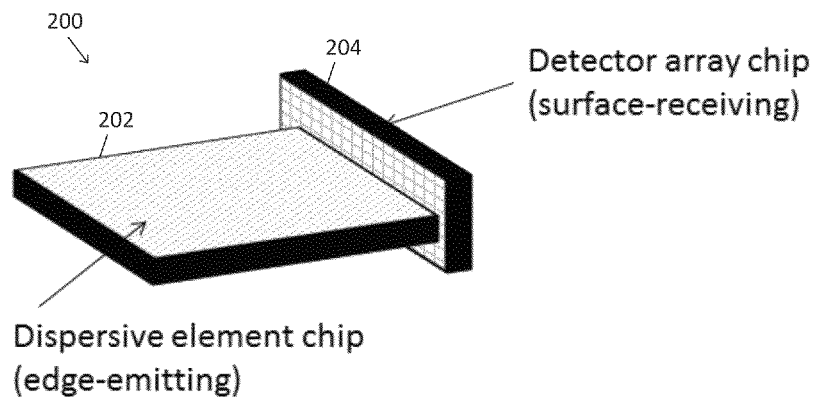
FIG. 7A shows an example embodiment of an arrangement between a spectrometer on one chip and a detector array on a different chip.

Referring now to FIG. 7A, shown therein is an example embodiment 200 of an arrangement between a chip 202 containing one or more dispersive elements and a second, different chip 204 containing a detector array. In this case there is an edge-to-face orientation between the dispersive element chip 202 and the detector array chip 204 in order to transmit output optical signals from the dispersive element chip 202 to the plane containing the inputs of the detector array 204. This orientation is suitable for a detector array that has a 1D (i.e. linear) array of detector elements.

Figure 7B:
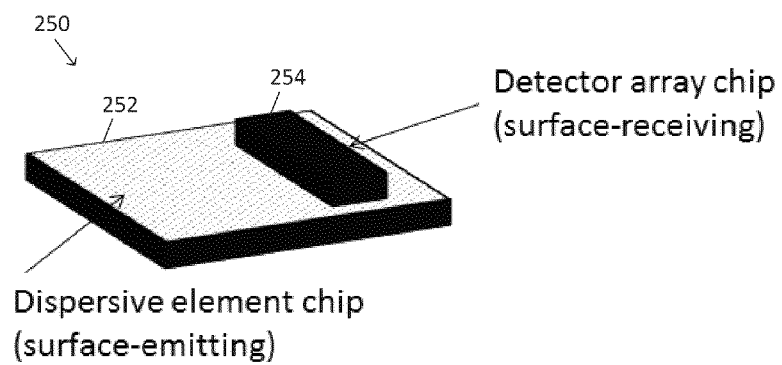
FIG. 7B shows another example embodiment of an arrangement between a spectrometer on one chip and a detector array on a different chip.

Referring now to FIG. 7B, shown therein is another example embodiment 250 of an arrangement between a chip 252 containing one or more dispersive elements and a second, different chip 254 containing a detector array. In this case there is a face-to-face orientation between the dispersive element chip 252 and the detector array chip 254 where the dispersive element chip 252 contains an element or elements to direct light out of the plane of the first chip and to the plane containing the inputs of the detector array 254. Examples of such elements include, but are not limited to, grating couplers, 45° mirrors, or directional scattering elements. This orientation is suitable for a detector array that has a either a 1D (i.e. linear) array of detector elements or a 2D (i.e. area) array of detector elements.

It should be noted that in both FIGS. 7A-7B, the dispersive element chip 202/252 contains optical devices in the plane of the chip, and the detector array chip 204/254 receives light normal to its chip surface.

Figure 8:
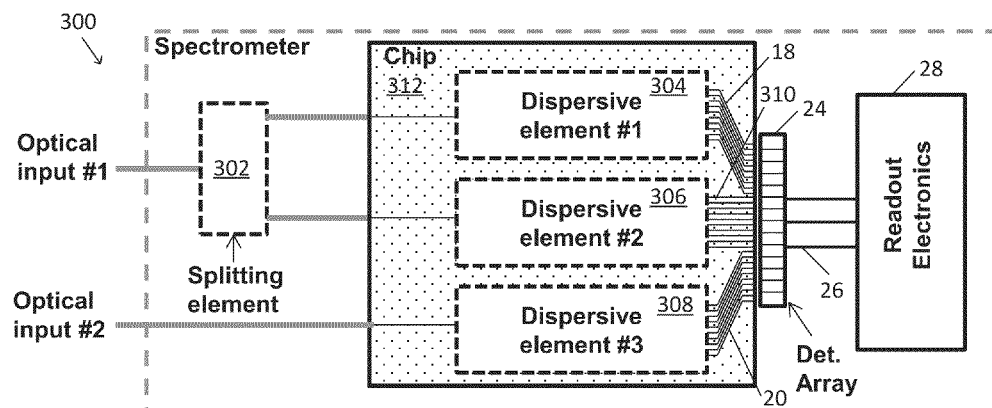
FIG. 8 shows an example embodiment of a spectrometer having multiple dispersive elements on a planar substrate and a single detector array.

Referring now to FIG. 8, shown therein is another example embodiment of a spectrometer 300 having a splitting element 302, multiple dispersive elements 304 to 308 and multiple waveguides 18, 310 and 20 on a planar substrate 312 (i.e. chip or IC) and a single detector array 24. The spectrometer 300 also comprises readout electronics that are coupled to the detector array 24. In alternative embodiments, at least one of the detector array 24 and the splitting element 302 may be implemented on the planar substrate 312. In alternative embodiments, the waveguides 18, 310 and 20 may not be needed.

The components of the spectrometer 300 function in the same way as similar components described previously. However, in this embodiment, there is more than one input signal that is provided to the spectrometer and the dispersive elements collectively generate more than two pluralities of spatially separated spectral components that do not necessary have different polarizations with respect to one another. Furthermore, it should be noted in this general case that the input optical signal can be split based on a principle other than polarization such as simply splitting the input optical signal into two separate, even or uneven strength input optical signals.

In use, a first initial input optical signal (Optical input #1) is received by the splitting element and separated into first and second input optical signals. The splitting may be done based on polarization, wavelength, amplitude or some other characteristic of the first initial input optical signal. The first and second input optical signals are sent to the first and second dispersive elements 304 and 306 respectively. The second initial input optical signal (Optical input #2) is sent directly to the third dispersive element 308.

The dispersive elements 304 to 308 each produce a plurality of spatially separated spectral components that are each captured as a plurality of narrowband optical signals by the corresponding waveguides 18, 310 and 20. The three pluralities of narrowband optical signals are then provided to different regions of the detector array 24 to measure the pluralities of narrowband optical signals. The measurements are then sent to the readout electronics 28 via electrical connections 26 where the measurements are read and provided as output data for viewing or other purposes.

The spectrometer 300 represents a general case in which it may be advantageous to combine multiple (e.g. two or more) dispersive elements along with zero, one, or more splitters and a single detector array into a multi-functional spectrometer. Such embodiments provide many advantages over conventional schemes in which each dispersive element would have its own detector array. Examples of these advantages include, but are not limited to, reduction in size, reduction in cost, reduction in computing requirements, simultaneous triggering of all outputs (since a single detector array is performing the detection), and a reduction in complexity of temperature dependency since the temperature dependency of only a single detector array need be taken into account compared to taking into account the different temperature dependencies of two or more separate detector arrays in conventional schemes. An example of where a single detector array can be shared for different dispersive elements is when there is a plurality of pixels in the detector array, such as 2048 pixels, but only a few pixels are needed to measure the output of each of several different dispersive elements.

It should be noted that the spectrometer 300 may be used in situations where multiple optical input signals may enter a spectrometer. For example, the different input optical signals may carry optical signals with different wavelength ranges or different polarization states, or the optical signals may be captured from different samples or different locations on the same sample, or the or the optical signals may be received from multiple outputs of an interferometer, for example.

It should also be noted that in various alternative embodiments of the spectrometer 300, one or more splitting elements may be included to split one input optical signal into multiple input optical signals that may differ in at least one of wavelength, polarization state, or other properties of the input optical signal.

It should also be noted that in various embodiments of the spectrometer 300, the different dispersive elements on the chip 312 can be configured to operate over different wavelength ranges, to disperse input optical signals into different resolutions, to operate for different polarization states, or to operate differently with respect to other optical properties of the input optical signals.

The various example embodiments that in accordance with the teachings herein show that a chip-based system allows for many complex permutations of optical elements to be implemented for a spectrometer which would be impossible or impractical to implement in free-space optics.

In an alternative for the various spectrometer embodiments described herein, the detector array (and/or readout electronics) can be located on the same chip as the spectrometer in order to completely eliminate any manual alignment of the outputs of the spectrometer to the inputs of the detector array.

In a further alternative for the various spectrometer embodiments described herein, if the detector array is located on a separate chip as is shown in FIGS. 1 to 3, 7A, 7B and 8, then one or more lenses can be placed between the dispersive element chip and the detector array to refocus the output optical signals from the dispersive element chip and to improve coupling efficiency.

In one aspect, the various polarization-sensitive spectrometer embodiments illustrated and described herein in which at least one dispersive element configuration is implemented on an integrated or planar substrate allow for the construction of smaller, simpler, single-camera or single detector array polarization-sensitive spectrometers with fewer components requiring manual alignment. This reduces costs as well as improves reliability and robustness compared to conventional spectrometers that are implemented using free-space optical elements and are bulky and expensive. In particular, the solid-state form of the various polarization-sensitive spectrometer embodiments described herein provides increased robustness which is unequaled in complex free-space optics systems and also enables point-of-care applications, meaning that at least some of the spectrometer systems described herein can be taken in the field to analyze various samples, which has previously not been possible. The elements of the various polarization-sensitive spectrometer embodiments illustrated herein that are implemented on an integrated substrate can also be easily integrated with other on-chip components.

In another aspect, at least some of the various polarization-sensitive spectrometer embodiments illustrated and described herein can reduce speckle noise in OCT images. This is done by taking advantage of the difference in polarization characteristics between a speckle and light from the target. In addition, this technique has value in discriminating between a desired (predominantly polarized) OCT signal from a predominantly unpolarized background signal (for example, singly-scattered vs. multiply-scattered light).

In another aspect, at least some of the various polarization-sensitive spectrometer embodiments illustrated and described herein can be used to remove common-mode noise that affects both polarizations in an optical signal. A conventional spectrometer that is insensitive to the polarization of the incoming light cannot differentiate common-mode noise in an acquired spectrum. But in the case of a polarization-sensitive spectrometer according to the teachings herein, it is possible to implement more sophisticated discriminatory criteria in order to filter common-mode noise. For example, imposing smoothness limits on the changing polarization with wavelength, acquiring the target phase image, and proper phase calibration can all be used to mitigate the effects of common-mode noise, which is beyond the capabilities of single-polarization or polarization-insensitive spectrometers.

In another aspect, the various polarization-sensitive spectrometer embodiments illustrated and described herein eliminate the need for zero-birefringence (or "polarization compensation") in waveguide devices.

It should be noted that while the various embodiments described herein have described processing an input optical signal to derive a first and a second plurality of narrowband optical signals that have TE and TM polarization states respectively, it should be understood that these embodiments can be designed to more generally process the input optical signal to derive a first and a second plurality of narrowband optical signals having a first polarization state and a second polarization state, respectively. Accordingly, the usage of various parameters for the TE and TM modes can more generally be represented by parameters for first and second polarization states.

It should be noted that in the various embodiments according to the teachings herein, two or more pluralities of narrowband optical signals may be derived from two or more pluralities of spatially separated spectral components in several different ways. For example, in some embodiments, this derivation may be performed by two or more waveguide arrays that capture two or more pluralities of narrowband optical signals from two or more pluralities of spatially separated spectral components that are provided as inputs to the two or more waveguide arrays. Alternatively in some embodiments, this derivation may be performed by a single detector array that captures two or more pluralities of narrowband optical signals from two or more pluralities of spatially separated spectral components that are provided as inputs to the single detector array.

At least some of the elements of the various OCT embodiments described herein, may at least partially be implemented via software and written in a high-level procedural language such as object oriented programming, a scripting language, assembly language, machine language, firmware or any other suitable programming language as needed. The program code can be stored on a storage media or on a computer readable medium that is readable by general or special purpose programmable electronics having a processor or associated hardware that is sufficient to implement the required functionality. The program code, when read by a processor or associated hardware, configures these elements to operate in a specific and predefined manner in order to perform at least one of the functions described herein.

While the above description provides examples of various embodiments, it will be appreciated that some features and/or functions of the described embodiments are susceptible to modification without departing from the principles of operation of the described embodiments. Accordingly, what has been described above has been intended to be illustrative of the subject matter described herein and non-limiting and it will be understood by persons skilled in the art that other variants and modifications may be made without departing from the scope of the claimed subject matter as defined in the claims appended hereto. Furthermore, the scope of the claims should not be limited by the preferred embodiments and examples described herein, but should be given the broadest possible interpretation that is consistent with the description as a whole.

The invention claimed is:

1. A spectrometer comprising:
    at least two dispersive elements, each configured to receive an input optical signal and to generate a plurality of spatially separated spectral components, at least a portion of the at least two dispersive elements being implemented on a first integrated substrate;
    a single detector array coupled to the at least two dispersive elements and configured to receive and to measure two or more of the pluralities of spatially separated spectral components; and
    at least one waveguide implemented on the first integrated substrate for providing light coupling between the at least two dispersive elements and the single detector array,
    wherein the at least one waveguide comprises at least one slab waveguide or at least one waveguide array.

2. The spectrometer of claim 1, wherein the spectrometer comprises the at least one waveguide array implemented on the first integrated substrate for providing light coupling between the at least two dispersive elements and the single detector array, the at least one waveguide array producing one or more pluralities of narrowband optical signals from one or more of the pluralities of spatially separated spectral components.

3. The spectrometer of claim 1, further comprising at least one splitting element that is configured to receive an input optical signal of the spectrometer and to produce at least one input optical signal for each of the at least two dispersive elements.

4. The spectrometer of claim 3, wherein the at least one splitting element is implemented on the first integrated substrate or a separate integrated substrate.

5. The spectrometer of claim 3, wherein the at least one splitting element is configured to perform splitting based on wavelength and to produce the at least one input optical signal for each of the at least two dispersive elements with different wavelength ranges that are each a subset of the wavelength range of the input optical signal of the spectrometer.

6. The spectrometer of claim 3, wherein the at least one splitting element is configured to separate the input optical signal of the spectrometer into the at least one input optical signal for each of the at least two dispersive elements with different amplitudes that are smaller than an amplitude of the input optical signal of the spectrometer.

7. The spectrometer of claim 3, wherein the at least one splitting element is configured to perform splitting based on polarization and to produce the at least two input optical signals with different polarization states from one another.

8. The spectrometer if claim 7, wherein the at least one splitting element comprises one of a planar concave grating element and an arrayed waveguide grating element.

9. The spectrometer of claim 1, wherein the spectrometer is configured to receive two or more input optical signals for coupling with the at least two dispersive elements without splitting the input optical signals.

10. The spectrometer of claim 1, wherein one or more of the dispersive elements comprises a planar concave grating or an arrayed waveguide grating.

11. The spectrometer of claim 1, wherein the at least two dispersive elements are configured to share a common footprint in a polarization-splitting grating configuration implemented on the first integrated substrate and having a difference in effective indices of refraction for first and second polarization states over an operating bandwidth range to spatially separate two polarization components of the initial input optical signal such that a minimum output angle of a first plurality of spatially separated spectral components having a first polarization state is larger than a maximum output angle of a second plurality of spatially separated spectral components having a second polarization state over the operating bandwidth range.

12. The spectrometer of claim 1, further comprising readout electronics to receive the measurements from the single detector array and to generate output samples thereof having a desired output data format.

13. The spectrometer of claim 12, wherein the single detector array and the readout electronics are implemented on the same integrated substrate as the dispersive elements, or on a different integrated substrate.

14. The spectrometer of claim 1, wherein the single detector array is on a second integrated substrate of a different chip and a face or an edge of the first integrated substrate is directed to a face of the second integrated substrate in order to capture the two or more pluralities of spatially separated components at inputs of the single detector array.

15. The spectrometer of claim 1, wherein the single detector array is located on a different integrated substrate than the first integrated substrate and one or more lenses are located between the first integrated substrate and the single detector array to refocus the two or more pluralities of narrowband optical signals and to improve coupling efficiency.

16. The spectrometer of claim 1, wherein the single detector array is a linear detector array.

17. A method of measuring two or more pluralities of spatially separated spectral components, the method comprising:
    receiving at least one input optical signal;
    generating two or more pluralities of spatially separated spectral components from the at least one input optical signal by providing the at least one input optical signal to at least two dispersive elements with at least a portion of the at least two dispersive elements being implemented on a first integrated substrate; and measuring the two or more pluralities of spatially separated spectral components with a single detector array, wherein at least one waveguide is implemented on the first integrated substrate to provide light coupling between the at least two dispersive elements and the single detector array, the at least one waveguide comprising at least one slab waveguide or at least one waveguide array.

18. The method of claim 17, wherein at least one splitting element is implemented on the first integrated substrate or a separate integrated substrate and is configured to receive an input optical signal of the spectrometer and to produce at least one input optical signal for each of the at least two dispersive elements.

19. The method of claim 18, wherein the splitting is performed based on one of wavelength, polarization, and amplitude.

20. The method of claim 18, wherein the splitting is performed using one of a planar concave grating element or an arrayed waveguide grating element.

21. The method of claim 17, wherein the at least two dispersive elements comprise first and second dispersive elements and the method further comprises:

receiving a first input optical signal at the first dispersive element disposed on the first substrate;

generating a first plurality of spatially separated spectral components with the first dispersive element;

receiving a second input optical signal at the second dispersive element disposed on the first substrate; and generating a second plurality of spatially separated spectral components with the second dispersive element.

22. The method of claim 17, wherein the method further comprises:

receiving an initial input optical signal as the at least one input optical signal at a polarization splitter;

generating the first input optical signal to have a first polarization state over an operating bandwidth range using the polarization splitter;

generating the second input optical signal to have the second polarization state over the operating bandwidth range using the polarization splitter;

generating the first plurality of spatially separated spectral components having the first polarization state with the first dispersive element; and generating the second plurality of spatially separated spectral components having the second polarization state with the second dispersive element.

23. The method of claim 17, wherein the at least two dispersive elements are configured to share a common footprint in a polarization-splitting grating configuration implemented on the first substrate, the polarization-splitting grating configuration having a difference in effective indices of refraction for first and second polarization states over an operating bandwidth range and the method comprises:

receiving an initial input optical signal as the at least one input optical signal at the polarization-splitting grating configuration; and spatially separating the initial input optical signal into a first plurality of spatially separated signals having a first polarization state and a second plurality of spatially separated signals having a second polarization state.

24. The method of claim 23, wherein the method comprises:

spatially separating the two polarization states of the initial input optical signal such that a minimum output angle of the first plurality of spatially separated spectral components having the first polarization state is larger than a maximum output angle of the second plurality of spatially separated spectral components having the second polarization state over the operating bandwidth range.

25. The method of claim 24, wherein the polarization-splitting grating configuration has a difference in effective indices of refraction for the first and second polarization states such that the first plurality of spatially separated spectral components having the first polarization state is disposed along a first portion of an output of the polarization-splitting grating configuration and the second plurality of spatially separated spectral components having the second polarization state is disposed along a second portion of the output different than the first portion.

* * * * *

UNITED STATES PATENT AND TRADEMARK OFFICE
CERTIFICATE OF CORRECTION

| | | |
|---|---|---|
| PATENT NO. | : 9,228,900 B2 | Page 1 of 1 |
| APPLICATION NO. | : 14/582453 | |
| DATED | : January 5, 2016 | |
| INVENTOR(S) | : Kyle Preston et al. | |

It is certified that error appears in the above-identified patent and that said Letters Patent is hereby corrected as shown below:

Claims
Column 22, line 13, claim 8 that reads "The spectrometer if claim 7, wherein at least one..." should read "The spectrometer of claim 7, wherein at least one...".

Signed and Sealed this
Nineteenth Day of April, 2016

Michelle K. Lee
*Director of the United States Patent and Trademark Office*